(12) United States Patent
Staltmayer et al.

(10) Patent No.: US 6,309,013 B1
(45) Date of Patent: Oct. 30, 2001

(54) OPENABLE MOTOR VEHICLE ROOF WITH ADJUSTABLE HEADLINER PART

(75) Inventors: Thomas Staltmayer, Gauting; Engelbert Hirschvogel, Hofstetten; Günther Schwanitz, Weilheim; Martin Danzl, Neubeuern; Robert Werner, Stammham; Siegfried Betz, Wettstetten; Erik Hilfrich, Ingolstadt, all of (DE)

(73) Assignees: Webasto Vehicle System International GmbH, Stockdorf; Audi AG, Ingolstadt, both of (DE)

( * ) Notice: Subject to any disclaimer, the term of this patent is extended or adjusted under 35 U.S.C. 154(b) by 0 days.

(21) Appl. No.: 09/466,826

(22) Filed: Dec. 20, 1999

(30) Foreign Application Priority Data

Dec. 18, 1998 (DE) ................................. 198 58 676

(51) Int. Cl.⁷ ........................................................ B60J 7/00
(52) U.S. Cl. ............................................................ 296/214
(58) Field of Search .................................... 296/214, 213

(56) References Cited

U.S. PATENT DOCUMENTS

| | | | |
|---|---|---|---|
| 4,179,156 | * 12/1979 | Huisman | 296/214 |
| 4,671,564 | 6/1987 | Sumida et al. | 296/214 |
| 4,813,737 | * 3/1989 | Schlapp | 296/214 |
| 4,895,410 | * 1/1990 | Grimm et al. | 296/214 |

FOREIGN PATENT DOCUMENTS

85715 * 4/1987 (JP) ...................................... 296/214

* cited by examiner

Primary Examiner—Dennis H. Pedder
(74) Attorney, Agent, or Firm—Nixon Peabody LLP; David S. Safran

(57) ABSTRACT

A motor vehicle roof with a cover (14) which has a closed position in which it closes a roof opening (12) in a fixed roof skin (10), and which can be raised for ventilation purposes, and with an adjustable headliner part (16, 116) which can be both moved from a closed position in which it blocks viewing of the cover from the motor vehicle interior (18) and an open position in which it exposes the roof opening or the cover. The headliner can also be raised with the cover to increase the ventilation function. A coupling mechanism is provided for coupling the headliner to the cover for entraining the headliner to rise with the cover but is disengageable for uncoupling of the headliner part from the cover for enabling longitudinal movement of the headliner relative to the cover into said at least one pushed-back position. Engagement and disengagement the coupling mechanism can be position dependent or can be manually actuated.

22 Claims, 12 Drawing Sheets

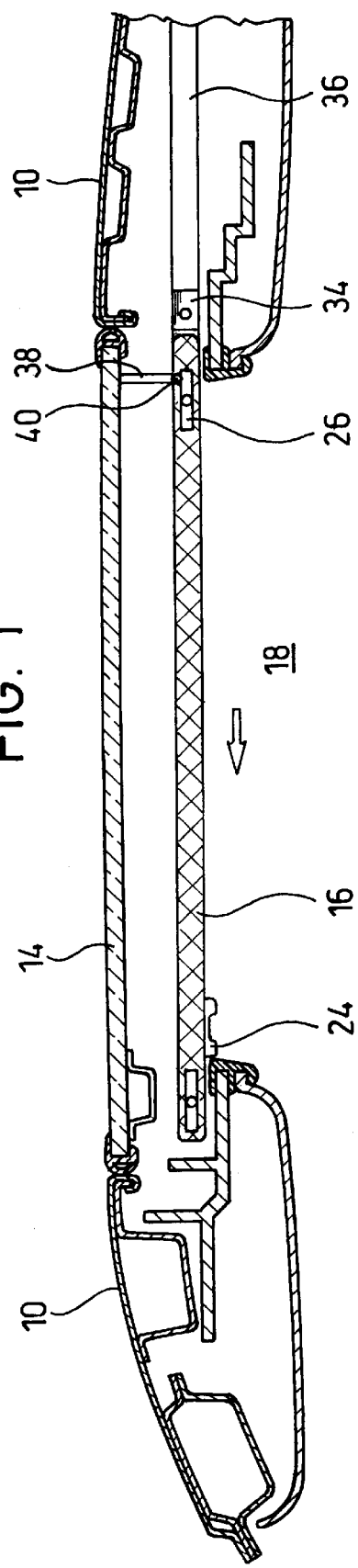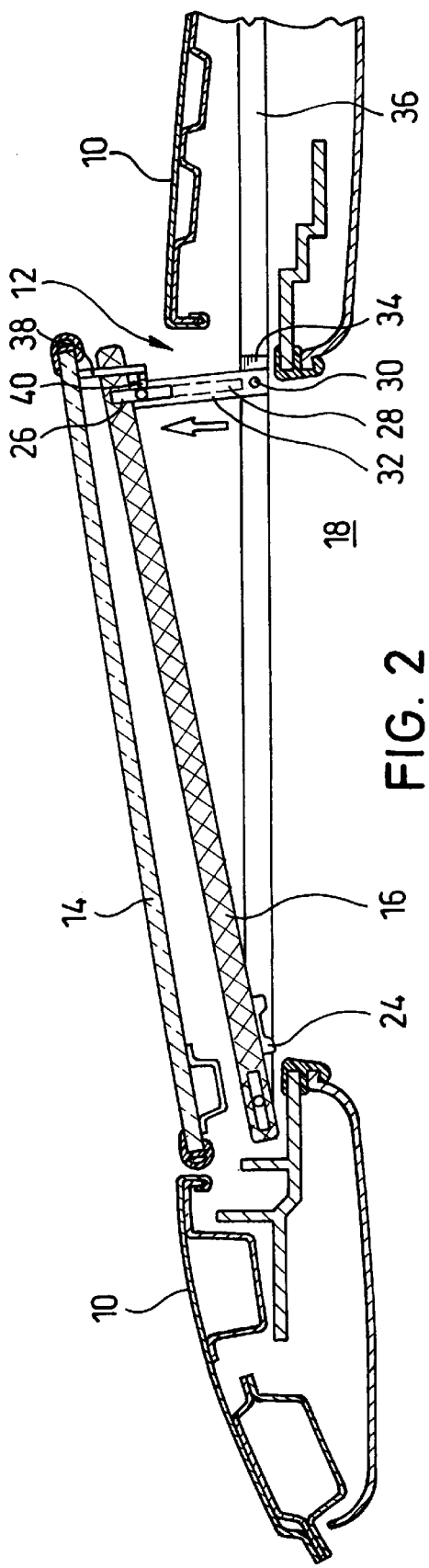

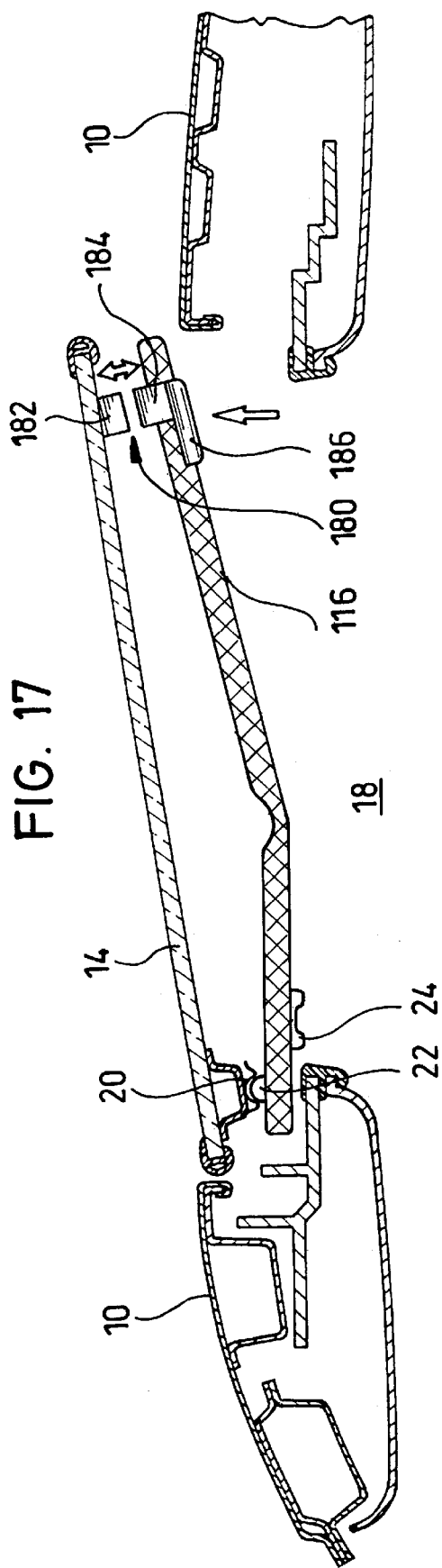
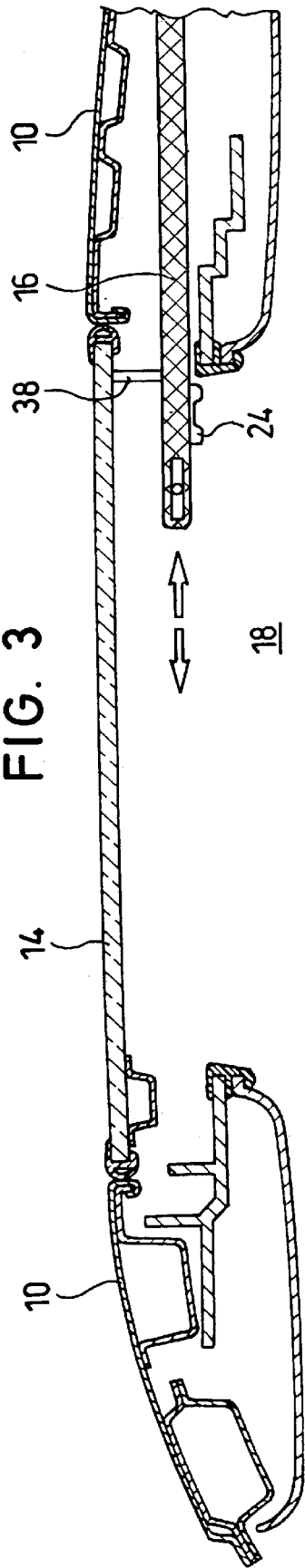

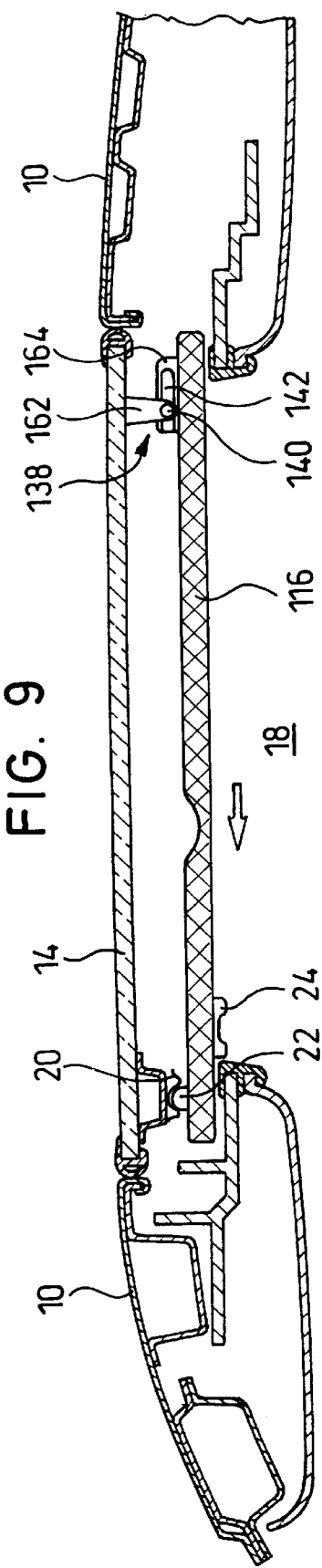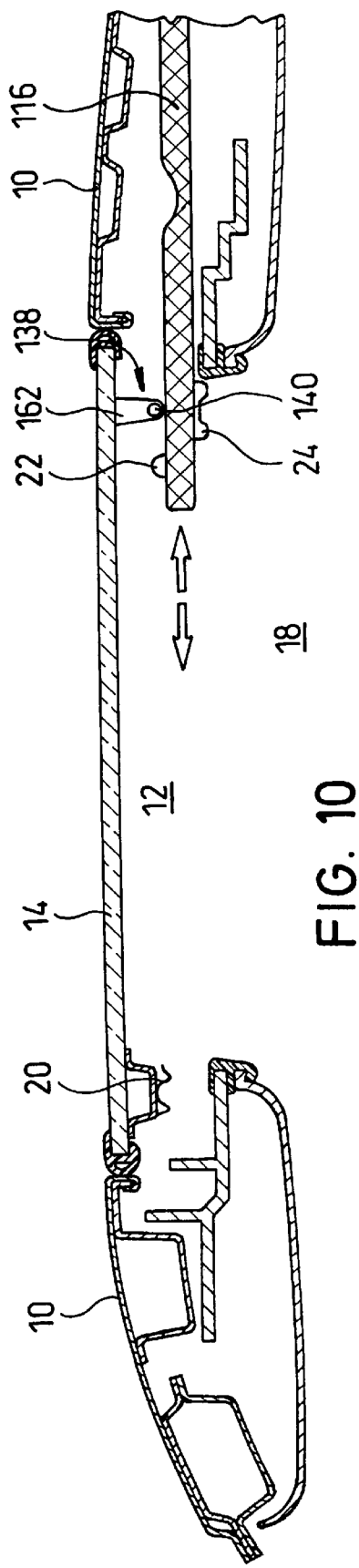

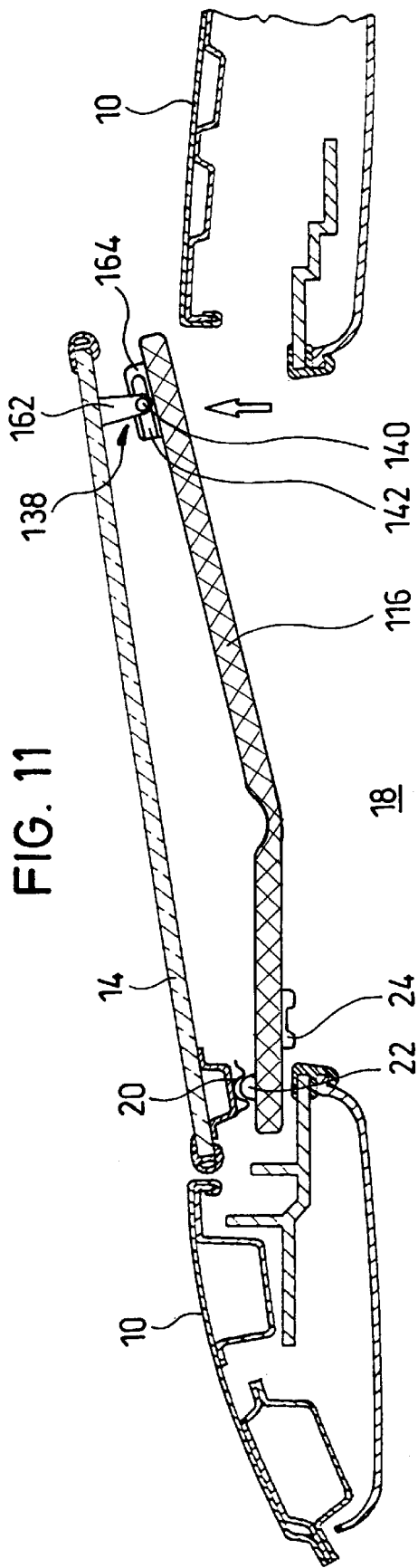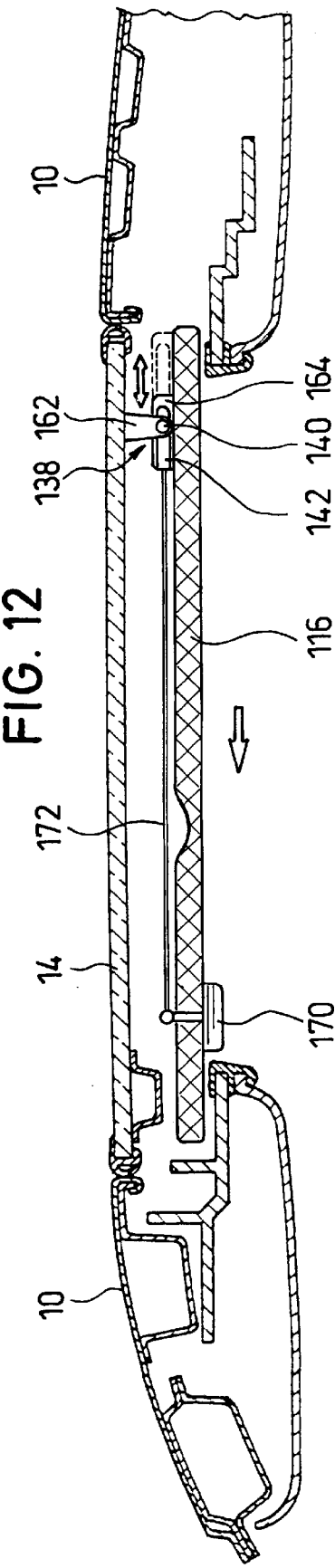

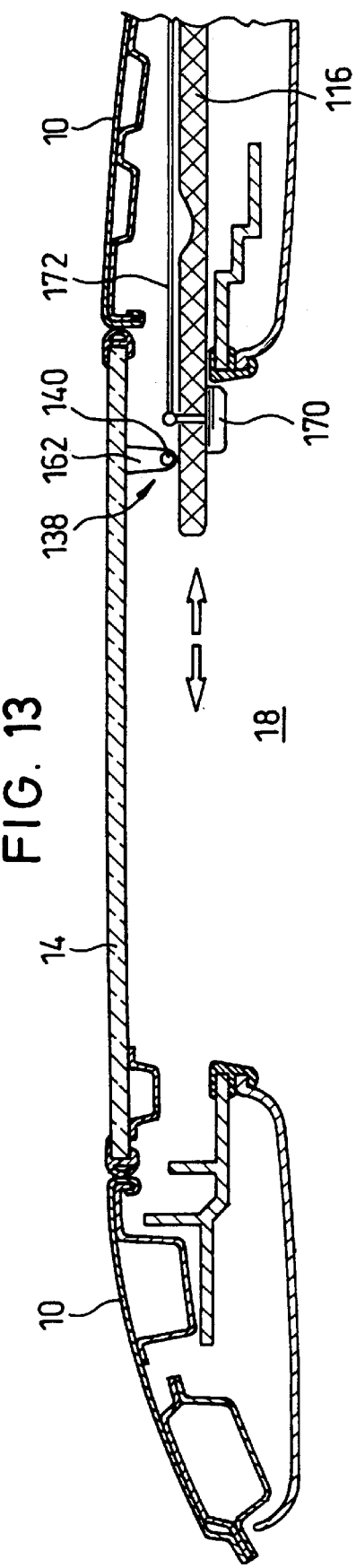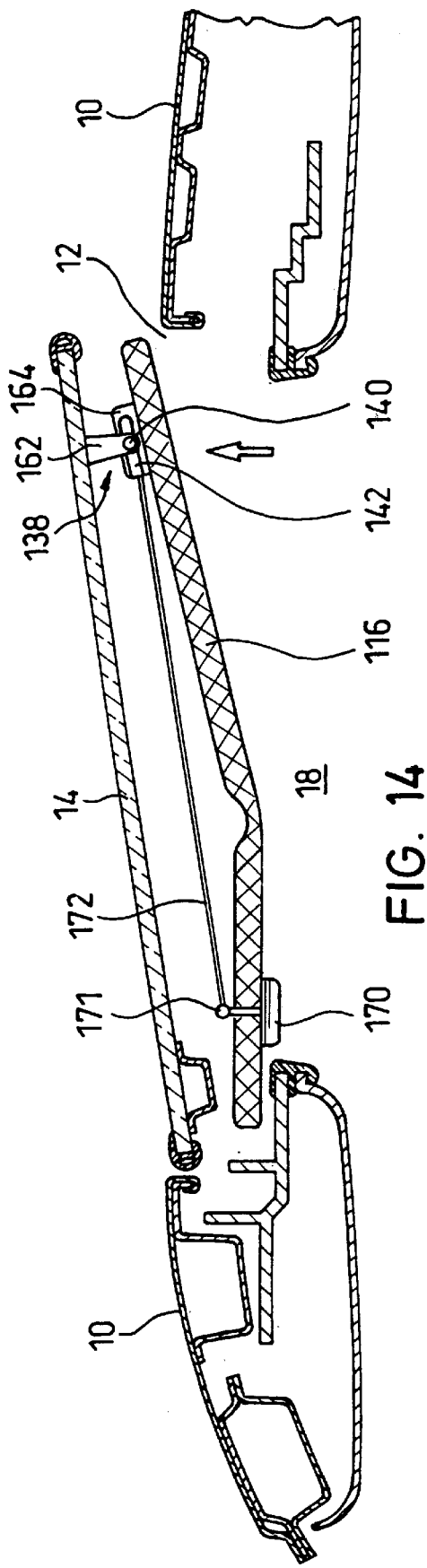

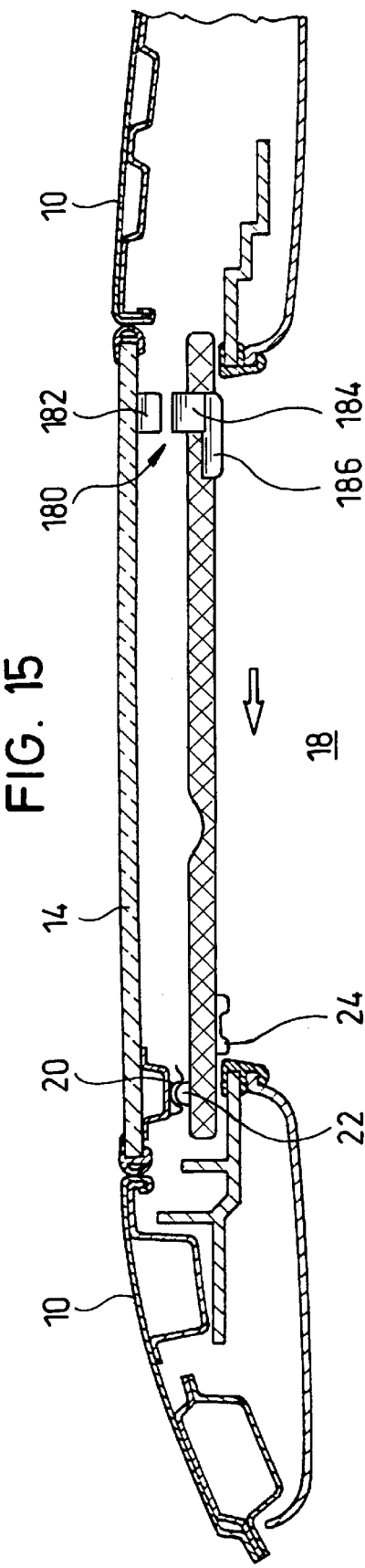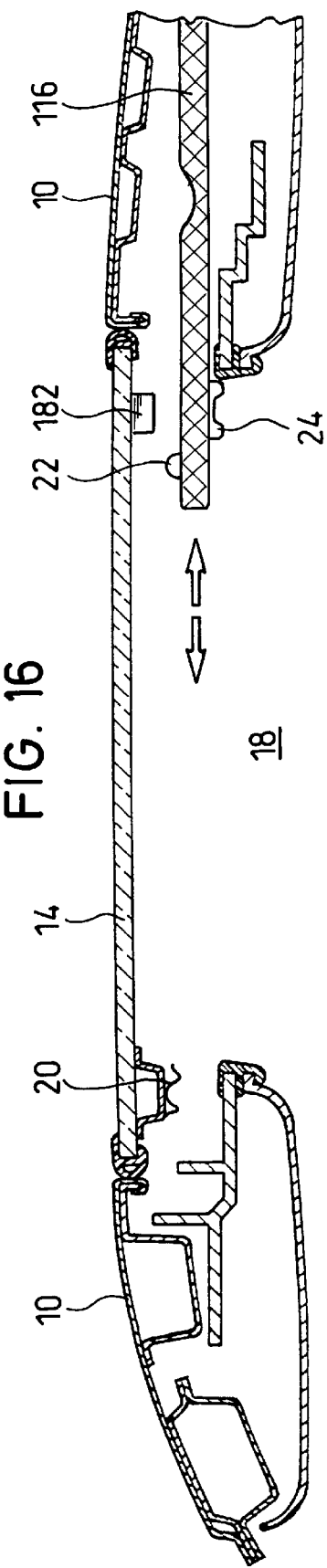

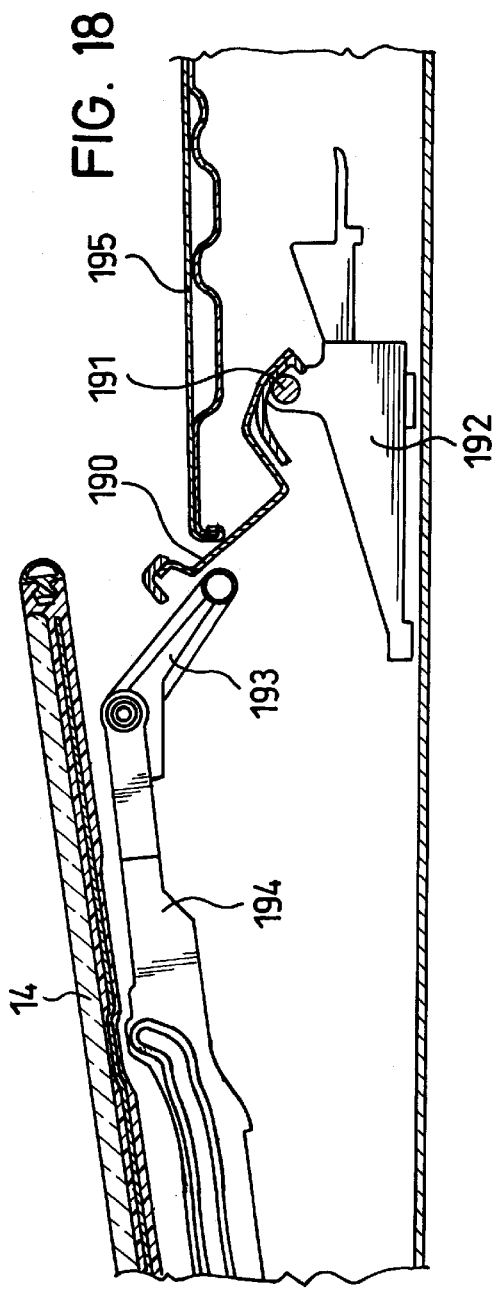
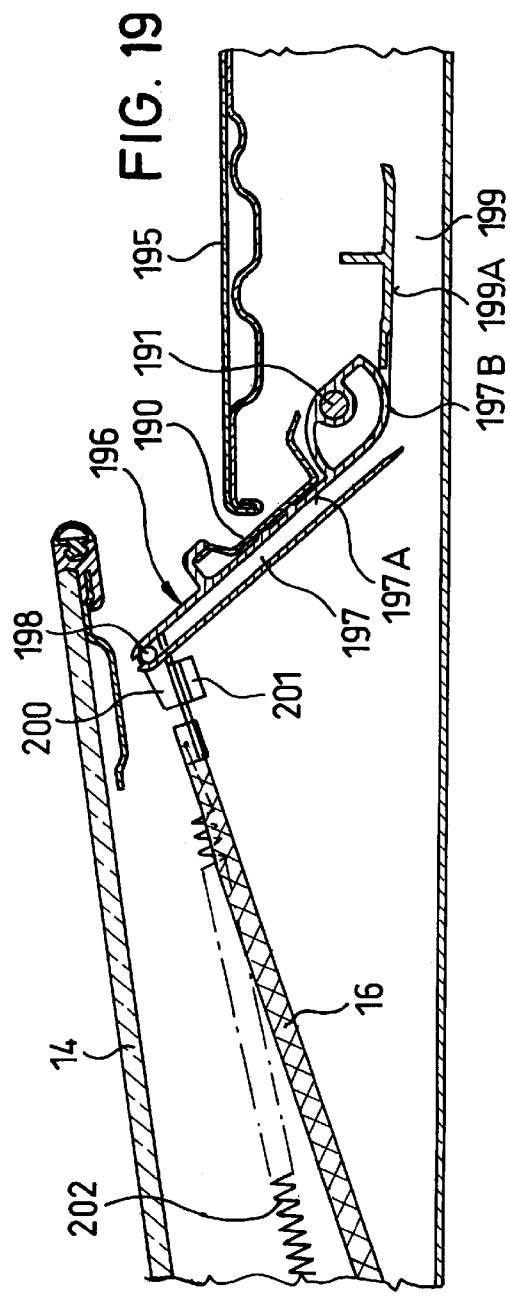

OPENABLE MOTOR VEHICLE ROOF WITH ADJUSTABLE HEADLINER PART

BACKGROUND OF THE INVENTION

1. Field of the Invention

This invention relates to an openable motor vehicle roof with a cover which, in its closed position, closes a roof opening in a fixed roof skin and which can be raised for ventilation purposes, and which is provided with an adjustable headliner part which can be moved from its closed position in which it blocks the view from the motor vehicle interior relative to both the cover or the roof opening, in order to expose the roof opening or the view of the cover, and which can also be raised with the cover to increase the ventilation function.

2. Description of Related Art

A generic openable motor vehicle roof of the initially mentioned type is known from German Patent DE 195 13 971 C2, in which the cover can be selectively raised from the closed position or can be pushed back to the rear to under the fixed roof skin in order to expose the roof opening. The cover and the headliner part are each provided with a separate adjustment mechanism and are driven by two separate drives which each comprise an electric motor and compressively-stiffdrive cables. There is an electrical control circuit to coordinate displacement and swinging processes of the headliner part and the cover in order to preclude collisions. Within the framework of this collision protection, the cover and the headliner part can, however, be adjusted independently of one another.

The disadvantage in this motor vehicle roof is the complex configuration, especially the requirement of two separate drives.

A simpler openable motor vehicle roof is known from German Patent DE 43 30 599 C1, which has a cover that can be selectively raised from its closed position or can be pushed to the rear to underneath the fixed roof skin and a headliner part which can be pushed in the lengthwise direction of the roof but which cannot be raised. A driver arrangement provides for the headliner part being automatically entrained by the cover when the latter is pushed back in order to expose the roof opening. When the cover is not pushed back, i.e., with the cover closed or raised, the sliding part is manually pushed in order to control the light incidence through the transparent cover into the vehicle interior. Another vehicle roof having these same general characteristics is described in U.S. Pat. No. 4,671,564.

The disadvantage in these motor vehicle roofs is that the headliner part cannot be raised to increase the ventilation function with the cover raised.

German Patent DE 25 51 335 C3 discloses an openable motor vehicle roof with an opaque cover which can be selectively raised from its closed position or which can be pushed to the rear to underneath the fixed roof skin and on which a headliner part is attached to block the view of the cover. However, this system is not suited for transparent covers.

SUMMARY OF THE INVENTION

A primary object of this invention is to devise a motor vehicle roof with a raisable transparent cover and a headliner part which can both be pushed back and also raised, and which still is made as simply and economically as possible.

This object is achieved by a motor vehicle roof of the initially mentioned type in which the headliner part is coupled to the cover when it is in a certain position area relative to the cover such that it is entrained by the cover when the cover is raised.

In the approaches according to the invention, it is advantageous that, in spite of optimum functionality of the headliner part, i.e., the displacement function to expose the roof opening or the view of the cover and the raising function to increase the ventilation function, a simple structure of the motor vehicle roof is possible since an additional drive for the headliner part can be dispensed with.

In a first approach, there is a permanent driver function for the headliner part, i.e., it depends only on the relative position between the headliner part and the cover whether the headliner part is entrained by the cover when the latter is raised. This approach ensures especially simple operation of the headliner part.

In another approach, the driver function for the headliner part is only selectively provided, i.e., the operator himself can decide whether the headliner part is to be entrained by the cover or not when the latter is raised. This allows greater flexibility of operation.

In both cases, the headliner part is preferably entrained when the cover is raised when it is in or near the closed position.

According to one preferred embodiment, the headliner part can be locked to the cover, this preferably taking place in the closed position of the cover, and the headliner part and the locking taking place or being released preferably by shifting the headliner part with respect to the cover.

In the first approach, with a permanent driver function, in the preferred embodiment, the headliner part, with the cover raised, can be moved out of the raised position or into the raised position. This has the advantage of very simple operation since the operator need not be concerned with the position of the cover or the headliner part since the headliner part can be moved completely independently of the cover position. In particular, the headliner part can be moved directly from the raised position without the cover having to be lowered first into its closed position for this purpose.

The headliner part is preferably guided for its displacement in a guide means which comprises a guide element which is pivotably-mounted in the raising direction of the headliner part. This represents an especially simple and reliable implementation.

Furthermore, the cover is preferably coupled to the guide element such that the cover entrains the guide element in its raising motion. This provides for reliable operation.

Here, preferably, the pivot bearing of the guide element can be moved in the displacement direction of the cover. This easily enables a sliding function of the cover which, in doing so, can entrain the headliner part via the guide element even during the sliding motion.

Preferably, the guide element is made as a crank with a guide slot into which a counterpiece on the headliner part fits. In the preferred embodiment, the cover and the guide element are coupled by engagement of a journal into a recess.

According to an alternative development of the approach with a permanent driver function, the headliner part cannot be moved in the raised state, but it can be moved independently of the cover position in the unraised state. This represents an especially simple configuration.

Preferably, the cover and the headliner part are coupled in a certain position area by means of sliding engagement, the sliding direction being essentially perpendicular to the raising direction. This is achieved, preferably, by the journal being formed on the cover and fitting into a crank which is made on the headliner part.

According to a preferred embodiment of the approach with a selective driver function, coupling takes place between the headliner part and the cover via a closure which alternately opens and closes when activated ("click-clack closure").

In an alternative embodiment of this approach, the coupling takes place by the cover and the headliner part being caused to engage by sliding by means of an actuation element, the sliding direction being essentially perpendicular to the raising direction.

Here, the headliner part is preferably supported such that, upon decoupling from the cover which is in the raised position, it is lowered in a damped manner in order to prevent excess noise development.

The actuating element is preferably made as a lever with a rod.

In the following, four embodiments of the invention are explained in detail in conjunction with the accompanying drawings.

BRIEF DESCRIPTION OF THE DRAWINGS

FIGS. 1 to 3 each show a schematic side cross-sectional view of a first embodiment of the invention in closed, raised and headliner pushed-back positions, respectively;

FIGS. 12 to 14 each show a schematic side cross-sectional view of a third embodiment of the invention in closed, headliner pushed-back, and raised positions, respectively;

FIGS. 15 to 17 each show a schematic side cross-sectional view of a fourth embodiment of the invention in closed, headliner pushed-back, and raised positions, respectively; and FIGS. 18 & 19 show how an optional rain gutter for the rear edge of the roof opening can be coupled to the headliner.

DETAILED DESCRIPTION OF THE INVENTION

Figure 4:
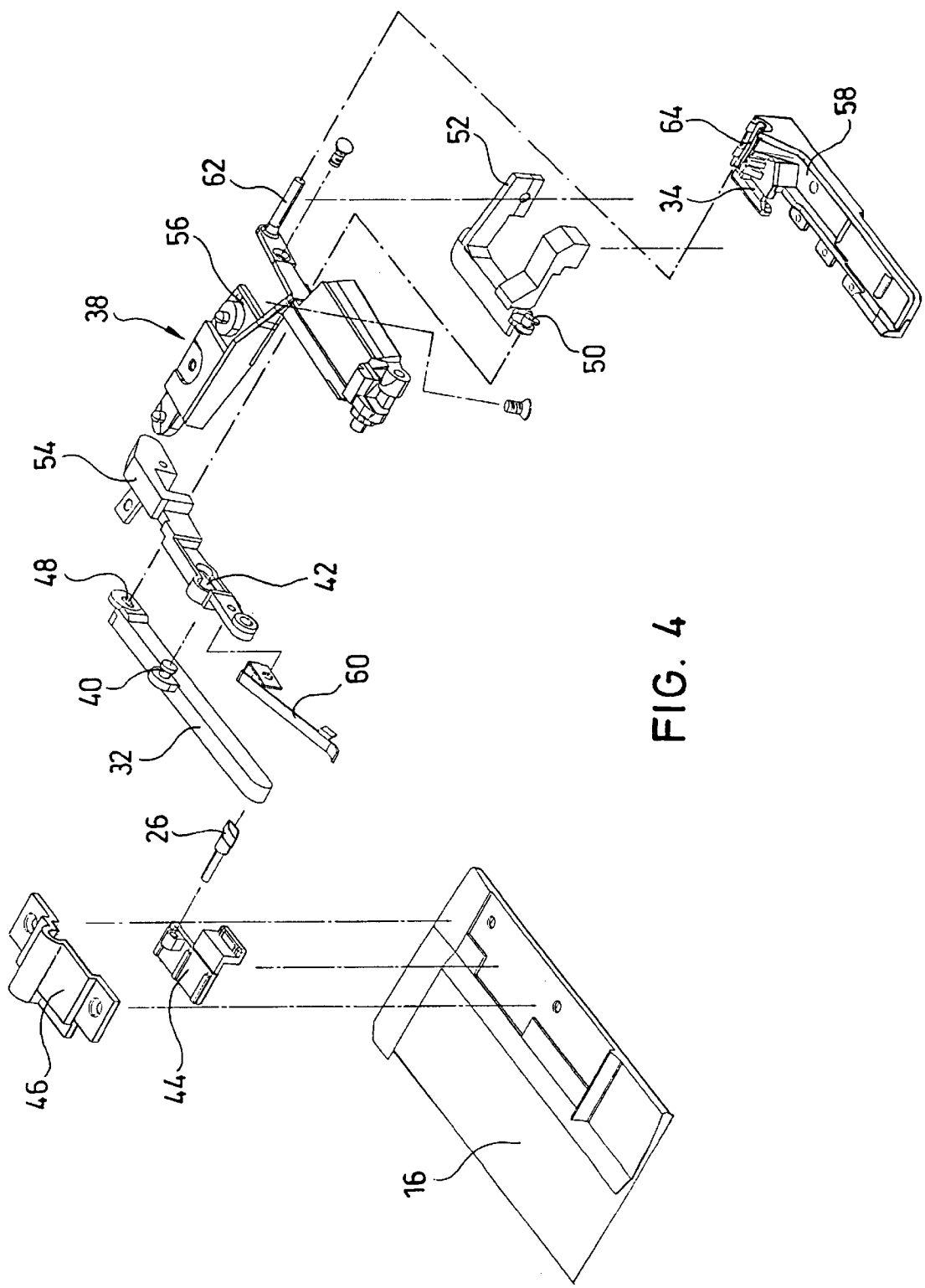
FIG. 4 is an exploded view of the driver mechanism of the motor vehicle roof shown in FIGS. 1 to 3.
Figure 5:
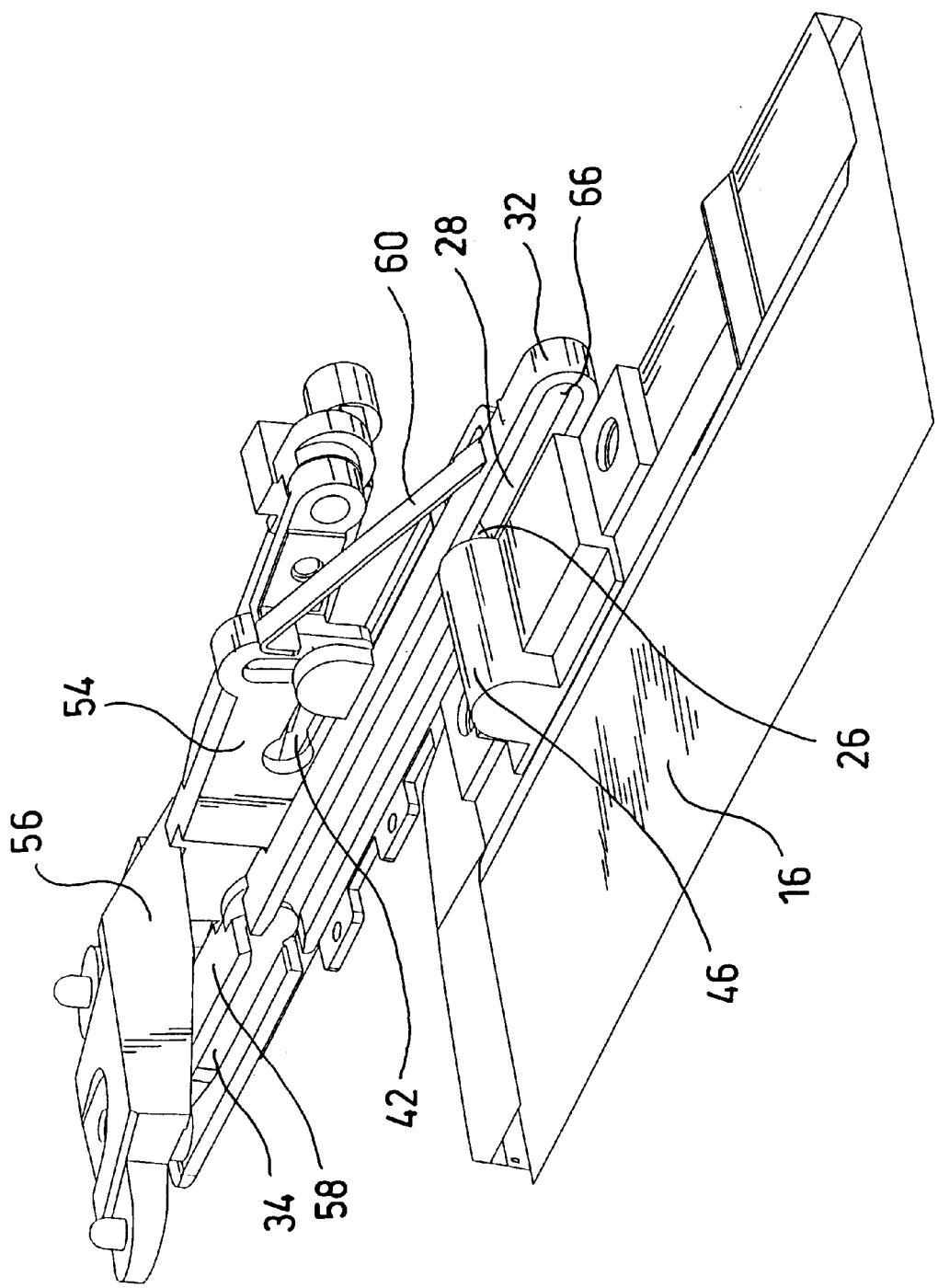
FIGS. 5 to 8 show different perspective views of the driver mechanism of FIG. 4 in the mounted state, FIGS. 9 to 11 each show a schematic side cross-sectional view of a second embodiment of the invention in closed, headliner pushed-back, and raised positions, respectively.
Figure 6:
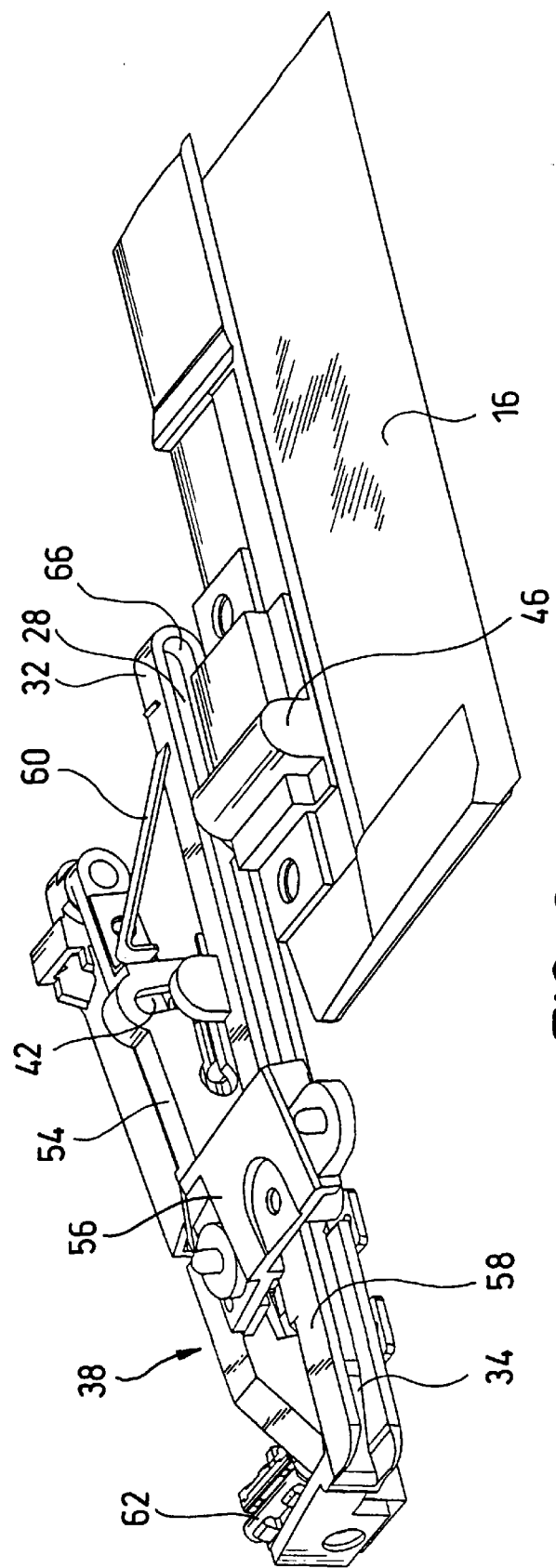
Figure 7:
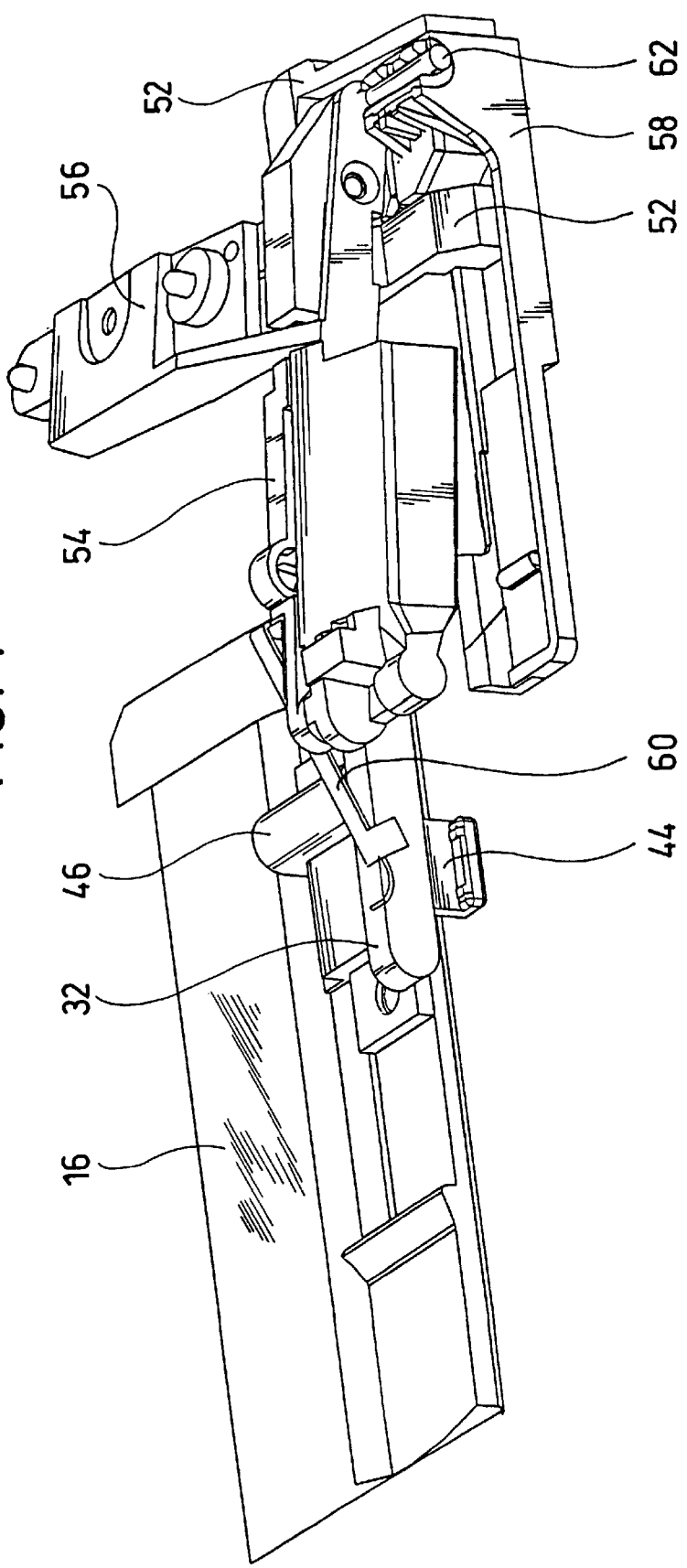

FIGS. 1 to 8 show a first embodiment vehicle roof in accordance with the present invention which has a permanent driver function. In a fixed roof skin 10, a roof opening 12 is formed which is closed by a transparent cover 14 in its closed position (FIG. 1). Underneath the cover 14 is a headliner part 16 which, in its closed position shown in FIG. 1, completely covers the transparent cover from below in order to prevent excess light incidence through the cover 14 into the motor vehicle interior 18.

A handle depression 24 is formed on the bottom of the headliner part 16 in the front area, and by means of handle depression 24, the driver or passenger can move the headliner part with respect to the cover 14. On the back end of the headliner part 16, a sliding block 26 is attached which fits, by sliding, into a crank slot 28 which is formed in a guide clement 32. Guide element is pivotably mounted at its rear end to a pivot bearing 30 so as to be able to swing up and down at its front end. The pivot bearing 30 can be moved in the lengthwise direction of the roof in a roof-mounted guide rail 36 together with a guide element 34 which carries the pivot bearing point 30, the pivot bearing 30 joining the rear end of the guide element 32 with the guide element 34.

A driver element 38 is attached on the back end of the cover 14 and has a journal pin 40 which fits into a recess 42 (FIGS. 4–6) which has been made in the guide element 32. The recess 42 is made such that the journal is movably guided essentially in the direction of movement of the headliner part 16 and the raising direction of the cover 14 and the headliner part 16. When the cover 14 is raised by means of a conventional drive, for example, a raising mechanism which is driven by compressively stiffdrive cables via an electrical motor and a rack, the rear edge of the cover moves up and in doing so lifts the swivelling guide element 32 with its front end which extends into the roof opening 12 upward via the driver element 38. Also the back end of the headliner part 16 is raised via engagement of the sliding block 40 in the crank slot 28 of the swivelling guide element 32 such that the raising motion of the cover 14 causes essentially parallel entrainment of the headliner part 16, by which it is likewise raised (see FIG. 2). By the entrainment of the headliner part 16 into a raised position, on the back end of the roof opening 12 a ventilation opening a is formed to ventilate the motor vehicle interior 18.

If the driver or passenger wants light to enter through the transparent cover 14, he can manually push the headliner part 16 to the rear by means of the handle depression 24 in order to clear the roof opening 12 and thus the view of or through the cover 14 (see FIG. 3)). Both in the closed position of the cover 14, which is shown in FIG. 1, and also in the ventilation position of the cover 14, which is shown in FIG. 2, this is easily possible by the sliding block 26 first sliding to the rear in the crank slot 28 of the swivelling guide element 32 and then in the guide element 34 and finally the roof-mounted guide rail 36. The guide elements 32 and 34 remain stationary in doing so. If the displacement of the headliner part 16 from the raised position shown in FIG. 2 is started, the headliner part 16 is first lowered with its rear edge first as a result of the upwardly swivelled position of the swivelling guide element 32 so that the headliner part 16 can finally be pushed underneath the fixed roof skin 10 to the rear. The cover 14 need not be lowered for this purposes. The headliner part 16 which has been pushed to the rear can initially be easily pushed again underneath the cover 14 in the reverse manner even with the cover 14 raised, the swivelled guide element 32 with the cover raised 14 providing for the corresponding raising motion of the headliner part 16.

The capacity of the guide elements 32 and 34 to move allows the cover 14 to be lowered from the closed position with its rear edge and subsequently moved to the rear underneath the fixed roof skin 10, the guide elements 32 and 34 likewise being pushed to the rear and in doing so entraining the headliner part 16 to the rear.

FIGS. 4 to 8 show the driver mechanism for raising the headliner part 16 in more detail. In doing so, the sliding block 26 is attached to the headliner part 16 by means of two fastening elements 44 and 46 and unillustrated screws. The swivelling guide element 32 is made in the manner of a lever, the pivot bearing 30 being formed by a recess 48 in the guide element 32 at its rear end and in which is suspended in a corresponding journal pin 50 of a fastening element 52 which is supported to move in the lengthwise direction of the roof. The driver element 38 is formed by an element 54 which has an opening 42 for the journal pin 40 of the swivelling guide element 32, and an element 56 which is permanently joined to it and which is connected to the underside of the cover 14. The fastening element 52 on which the swivelling guide element 32 is supported is connected to another slider element 58 which is supported to be able to move in the lengthwise direction of the roof and on which the guide element 34 is formed. A leaf spring 60 downwardly prestresses the front free end of the swivelling guide element 32 and is attached to the element 54 to prevent rattling noise and the like.

The cover-mounted element 56 has a journal 62 which, when the cover is not raised, is deposited in a recess 64 of the movable slider element 58 and thus provides for a frictional connection in the lengthwise direction of the roof. When the cover 14 is pushed back, the headliner part is entrained to the rear via the slider element 58 and the guide element 32 by contact of the shoe 26 with the front end 66 of the crank slot 28.

The cover 14 can also be made as a pure raisin, cover. In this case the swivelling guide element 32 is coupled permanently to the roof. It is also noted that while parts 38, 52, 54 and 58 are shown as separate elements, parts 38 and 54 could be made as a single part as could parts 52 and 58.

The second embodiment which is shown in FIGS. 9 to 11 with a permanent driver function differs from the first embodiment shown in FIGS. 1 to 8 mainly in that there is no pivoting guide element so that when the cover is raised, the headliner part is raised at the same time and the headliner part cannot move to the rear.

A driver element 138 is attached to the underside of the cover 14 in the rear area and comprises an arm 162 which has a journal 140 on its lower end. When the cover 14 and the headliner part 116 are located in or near their closed position shown in FIG. 9, the journal 140 of the driver element 138 fits, by sliding, into a guide slot 142 of a guide 164 that is attached on the top of the headliner part 116 in its rear area, the guide slot 142 extending essentially in the direction of the displacement of the headliner part 116.

Furthermore, on the front end of the cover 14, a catch receiver 20 is formed on its underside into which a catch projection 22, which is provided on the upper side of the front end of the headliner part 116, fits in the position which is shown in FIGS. 9 & 11, so that the cover 14 and the headliner part 116 are locked to one another. The receiver 20 or the projection 22 are made elastic so that their interlocking relationship can be established or released by parallel displacement of the headliner part 116 with respect to the cover 14

When the cover 14, proceeding from the closed position shown in FIG. 9, is raised at its rear end, via engagement of the journal 140 of the driver element 138 in the guide 164 on the headliner part 116, the cover entrains the rear end of the headliner part 116 so that the headliner part 116 is likewise moved into a raised position. As shown in FIG. 11, the headliner part 116 can be made such that, in this entrainment, the rear part of the headliner part 116 is bent upward with respect to the front part into a raised position.

In this position, the headliner part 116 cannot be pushed to the rear since the raising of the cover causes locking between the cover 14 and the headliner part 116.

Figure 8:
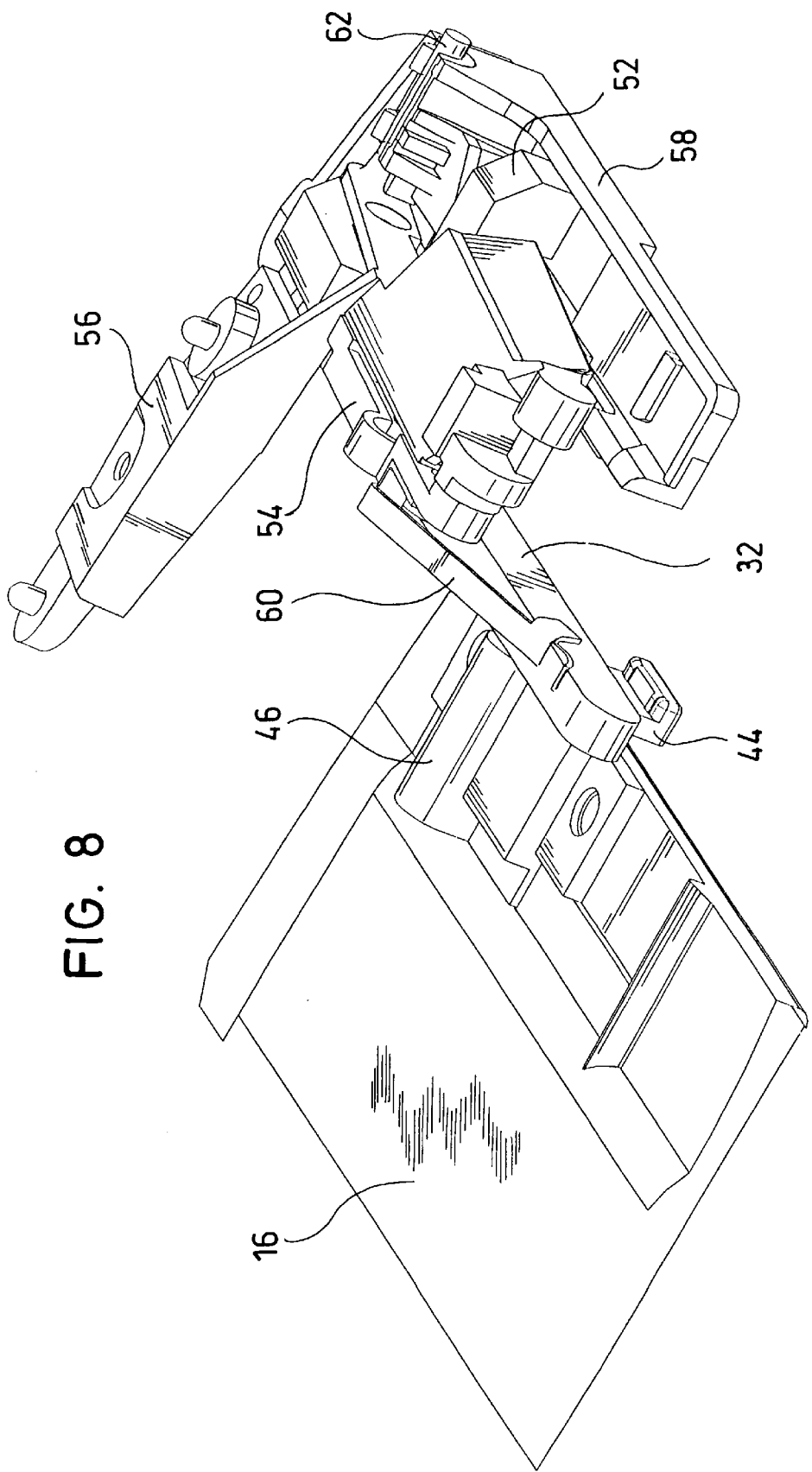

If the headliner part 116, proceeding from the raised position shown in FIG. 11 is to be released to expose the cover 14, first the cover 14 with the headliner part 116 must be lowered again into the closed position which is shown in FIG. 8, from which the headliner part 116 can then be pushed back to the rear by means of the handle depression 24, the headliner part 116 being initially guided with respect to the cover 14 by the journal 140 moving in the guide slot 142. As shown in FIG. 10, the headliner part 116 can be pushed almost completely underneath the fixed roof skin 10 in order to substantially fully expose the cover 14.

If the cover 14 is raised, proceeding from the closed position while the headliner part 116 is pushed so far to the rear that the journal 140 of the driver element 138 is disengaged from the slot 142 on the headliner part, there is no entrainment of the headliner part 116 into a raised position. In this case, the headliner part 116, even with the cover 14 raised, remains movable independently of the cover 14. In this case, care must be taken to insure that the cover 14 is only lowered when the headliner part 116 is not located so far forward that the journal 140 would come down onto the guide 164 or the guide 164 must be made to allow entry of the journal 140 from above.

A third embodiment is shown in FIGS. 12 to 14 which is similar to the second embodiment shown in FIGS. 9 to 11, differing however in that the driver function for the headliner part 116 can be selectively disengaged by means of an actuating element.

For this purpose, the guide 164 is not fixed to the headliner part 116, but rather can be moved longitudinally with respect to the headliner part 116 in the displacement direction of the headliner part 116 by means of an actuating clement, the actuating clement comprising a selection knob 170 which is attached in the area of the handle depression 24 and which has a lever 171 at it top end which, in the engaged position of FIGS. 12–14, is directed perpendicularly to the plane of the drawing, but which is swung forward with turning of the knob 170 to shift a rod 172 which is actuated by it and which is coupled to the movable guide 164. Thus, depending on the position of the selection knob 170, the guide 164 is pushed forward or backward with respect to the headliner part 116, the displacement path being chosen such that, in the a first position, e.g., the closed position of the cover 14 and the headliner part 116, which is shown in FIG. 12, the journal 140 of the driver element 138 fits into the guide slot 142 of the slide element 164, by which the cover 14 and the headliner part 116 are coupled, as in the second embodiment shown in FIGS. 9 to 11, for entrainment in the raising motion of the cover 14, while in second position, the journal 140 is removed from the rearwardly shifted guide slot 142 (as shown by the broken line in FIG. 12), so that, in this case, even when both the cover 14 and also the headliner part 116 are in the closed position, no entrainment of the headliner part 116 takes place when the cover 14 is raised.

As shown in FIG. 14, if journal 140 is not disengaged from guide slot 142 when the cover 14 is brought into the raised position, the headliner part 116 is entrained so as to be raised with it. In this case, however, the selection knob 170 can still be actuated so that the end of the headliner part 116 can be released by the journal 140 being disengaged from the guide slot 142. To prevent fast independent lowering of the back end of the headliner part 116, the rear area of the headliner part 116 is connected to a corresponding mechanism which causes damped automatic lowering of the headliner part 116 when the selection lever 170 is activated and with corresponding decoupling from the cover 14, e.g., a sliding block/guide element arrangement 26, 28, 32, 34 similar to that shown for the first embodiment could be constructed such that sliding block 26 in guide slot 28 functions as a pneumatic cushion device when sliding block 26 moves into guide slot 28. Alternatively, a spring or elastic member similar to member 202 as is described relative to the rain gutter arrangement of FIGS. 18 & 19, below, can be used.

Instead of a crank lever 171, an eccentric disk or other means can be provided to produce the forward and back movement of rod 172. Furthermore, preferably, a ball joint or other universal coupling is provided at each end of the rod 172 for connecting it to the crank lever 171 and the guide element 164 to allow for the varying angles which will occur when the headliner 116 is moved from the FIG. 12 position into the FIG. 14 position, and when the headliner 116 is lowered after being released when the cover is in the FIG. 14 position.

The fourth embodiment, which is shown in FIGS. 15 to 17, like the third embodiment shown in FIGS. 12 to 14, is a motor vehicle roof with a selective driver function, the fourth embodiment, however, differing from the third embodiment in that the coupling for the entrainment function takes place not via selective sliding engagement between the cover and headliner part, but via a closure 180 mechanism provided on the rear end of the cover 14 and the headliner part 116. The closure mechanism 180 comprises an element 182 which is attached to the underside of the cover 14, a counterpiece 184 which is formed on the top side of the headliner part 116 and which cooperates with the element 182, and an actuating lever 186. The closure mechanism 180 is made such that, by pressure actuation, it alternately engages or disengages (click-clack closure). Various types of devices can be used for the closure mechanism 180, such as a magnetic or electromagnetic coupling, rotation of the lever 186 causing a magnetic connection between parts 182 and 184 to be made or broken, such as by changing the polarity of the magnet or turning on/off an electromagnet.

Proceeding from the closed position which is shown in FIG. 15, when the closure mechanism 180 is engaged, the headliner part 116, with its rear end entrained, is raised when the cover 14 is raised (see FIG. 17). When, in such a raised position, the closure mechanism 180 is disengaged by actuating the actuating lever 186, the rear end of the driver element moves down automatically, there preferably being a damping mechanism as mentioned for the third embodiment in order to prevent unnecessary noise development. Then, the headliner part 116 can be pushed to the rear to underneath the fixed roof skin 10 in order to expose the cover 14. When the closure 180 is opened in the closed position shown in FIG. 15, the headliner part 116 is not entrained at all when the cover 14 is raised, so that the headliner part 116, with the closure 180 disengaged, can be slide rearward from its closed position shown in FIG. 15 to underneath the fixed roof skin 10, see FIG. 16.

Finally, with the cover 14 raised and the headliner part 116 not entrained, the headliner part 116 can be moved manually into a raised position by first pushing the headliner part 116 entirely forward into the closed position in which it locks on its front end to the cover 14, and then the rear end of the headliner part 116 can be manually brought up to the raised cover 14 and the closure mechanism 180 engaged by operation of the actuating lever 186.

In all these embodiments, the cover 14 can be basically made as a raising cover or as a sliding-raising cover, in the latter case, the driver or coupling mechanism between the cover and headliner part being made for corresponding relative vertical displacement when the rear edge of the cover is lowered to retract underneath the fixed roof skin.

Furthermore, all of the described embodiments can be equipped with a rain gutter arrangement as will now be described with reference to FIGS. 18 & 19.

A rain gutter 190 is pivotably journaled by a pin 191 to a slide 192. At its front end, the rear drip rail 190 is linked by a lever 193 to a guide member 194 that is fixed to the cover 14. By means of the lever 193, the rain gutter 190 is tilted so as to raise its front edge above the rear fixed roof skin 195 when the cover 14 has been tilted upward. As shown in FIG. 19, the rain gutter has a guide means 196 at its underside. The guide means 196 has a guiding slot 197 which guides a pin 198 which is fixed to a coupling device 200 that is slidably arranged on the headliner 16 perpendicular to the plane of projection. An upper guiding surface 197A of slot 197 has an arc-shaped rear portion 197B, so that it always remains in close contact to the adjacent upper guiding surface 199A of a rear horizontal guide channel 199 during the tilting movement of the rain gutter 190. The rear horizontal guide channel 199 serves for guiding the rear slider 201 of headliner 16 when it is pushed back.

The front of the rear horizontal guide channel 199 has a wedge-shaped portion perpendicular to the plane of projection by means of which the pin 198 is brought out of contact with the slot 197, and simultaneously, the slider 201 is brought into engagement with the guide channel 199 if the headliner is lowered manually and pushed back with the cover 14 tilted upward.

On the upper side of the headliner 16 is an elastic or spring type resilient member 202, such as a tension spring, which is fixed on one end to a rear portion of the headliner 16 which is tilted, while its other end (not shown) is fixed to the upper side of a front portion of the headliner 16 which is not tilted (for instance, above the grip member 24 in FIG. 17). The resilient member 202 pulls the rear end of the headliner 16 toward the front, and thus, keeps pin 198 in supporting engagement with the lower guiding surface of slot 197, so that the rear end of the headliner 16 cannot slide down along the slot 197 as a result of its own weight.

In the closed position of the roof, the rain gutter lies horizontally under the rear edge of the cover 14 and rear fixed roof skin 195 and does not interfere with sliding of the headliner 16 rearward to expose the cover 14.

What we claim is:

1. Motor vehicle roof comprising a cover, which has a closed position closing a roof opening in a fixed roof skin and a raised position for ventilation of a motor vehicle interior space, an adjustable headliner part which is displacable from a covering position in which it blocks viewing of the cover from the motor vehicle interior space to at least one pushed-back position in which the cover is at least partially exposed, and a coupling mechanism for coupling the headliner to the cover for entraining the headliner to rise with the cover to increase said ventilation, said coupling mechanism being disengageable for uncoupling of the headliner part from the cover for enabling longitudinal movement of the headliner relative to the cover into said at least one pushed-back position, wherein the headliner part is guided for displacement in a guide means which comprises a guide element which is mounted to pivot in a raising direction of the headliner part.

2. Motor vehicle roof as claimed in claim 1, wherein said coupling member entrains the headliner part to rise with the cover when the cover is raised and the headliner is at least near said covering position.

3. Motor vehicle roof as claimed in claim 2, wherein release means is provided for disengaging the coupling member the headliner part from the cover when the cover is in at least one of the closed position and said raised position.

4. Motor vehicle roof as claimed in claim 1, wherein the cover is coupled to the guide element at an end; and wherein a guide rail adjoins the coupled end of the guide 5. Motor vehicle roof as claimed in claim 1, wherein the cover is coupled to the guide element to entrain the guide element in its raising motion.

6. Motor vehicle roof as claimed in claim 5, wherein the cover and the guide element are coupled by engagement of a journal pin in a slot.

7. Motor vehicle roof as claimed in claim 6, wherein the journal pin is provided on the guide element and the slot is on a component which is attached to the cover.

8. Motor vehicle roof as claimed in claim 5, wherein the guide element has a pivot bearing which is movable in a longitudinal displacement direction of the cover.

9. Motor vehicle roof as claimed in claim 1, wherein the guide element has a guide slot into which a counterpiece on the headliner part fits.

10. Motor vehicle roof as claimed in claim 8, wherein the cover is rearwardly movable from the closed position to underneath the fixed roof skin; and wherein the guide element entrains the headliner part to move rearward during said rearward movement of the cover.

11. Motor vehicle roof as claimed in claim 1, wherein said coupling mechanism is disengageable for uncoupling of the headliner part from the cover only when the cover is in said closed position.

12. Motor vehicle roof as claimed in claim 11 wherein the cover and the headliner part are coupled in a predetermined relative positional area by means of sliding engagement between elements of said coupling mechanism, a direction of the sliding engagement being essentially perpendicular to the raising direction.

13. Motor vehicle roof as claimed in claim 12, wherein said elements comprise a journal pin on the cover which fits into a slot which is provided on the headliner part.

14. Motor vehicle roof as claimed in claim 1, wherein the coupling mechanism is manually engageable and disengageable.

15. Motor vehicle roof as claimed in claim 14, wherein coupling mechanism is a magnetic mechanism.

16. Motor vehicle roof as claimed in claim 14, wherein coupling mechanism comprises a coupling part on the cover and an actuating element for bringing the coupling part into and out of sliding engagement with a guide part on the headliner in a direction essentially perpendicular to the raising direction.

17. Motor vehicle roof as claimed in claim 16, wherein coupling part on the cover is a journal element which fits into a guide slot of the guide part on the headliner part; and wherein said guide part is movable by means of the actuation element essentially in a lengthwise direction of the guide slot.

18. Motor vehicle roof as claimed in claim 16, wherein the actuation element comprises a lever and a rod.

19. Motor vehicle roof as claimed in claim 1, wherein engagement of the headliner part to the cover takes place and is released by longitudinal displacement of the headliner part with respect to the cover.

20. Motor vehicle roof as claimed in claim 1, wherein the headliner part has a front part and a rear part, said rear part being upwardly tiltable relative to said front part such that, when the headliner part is entrained when the cover is raised, the rear part is bent upward with respect to the front part.

21. Motor vehicle roof as claimed in claim 1, wherein the cover is a sliding-lifting cover which is selectively raisable from the closed position and rearwardly displaceable to underneath the fixed roof skin.

22. Motor vehicle roof as claimed in claim 1, further comprising a rain gutter pivotably connected to a rear edge of the headliner so as to be upwardly raised at a front edge upon raising of the headliner with the cover.

* * * * *